United States Patent [19]
Tsunoda et al.

[11] Patent Number: 5,319,508
[45] Date of Patent: Jun. 7, 1994

[54] READ CIRCUIT IN MAGNETIC DISK DRIVE

[75] Inventors: Masahiko Tsunoda; Masako Mikada, both of Tokyo, Japan

[73] Assignee: Kabushiki Kaisha Toshiba, Kawasaki, Japan

[21] Appl. No.: 751,062

[22] Filed: Aug. 28, 1991

[30] Foreign Application Priority Data

Aug. 28, 1990 [JP]  Japan .................. 2-224194

[51] Int. Cl.⁵ .................. G11B 5/596; G11B 5/58
[52] U.S. Cl. .................. 360/77.08; 360/78.14; 360/46; 360/67
[58] Field of Search .............. 360/46, 135, 67, 68, 360/77.02, 77.08, 77.07, 78.04, 78.14, 73.13; 307/264, 497; 330/134, 135, 141

[56] References Cited

U.S. PATENT DOCUMENTS

| | | | |
|---|---|---|---|
| 3,660,821 | 5/1972 | Weber et al. | 360/48 |
| 3,790,896 | 2/1974 | Shimizu et al. | 307/264 |
| 4,326,226 | 4/1982 | Touchton et al. | 360/77.02 |
| 4,823,212 | 4/1989 | Knowles et al. | 360/77.08 |
| 5,184,257 | 2/1993 | Koga et al. | 360/78.04 |
| 5,187,619 | 2/1993 | Sidman | 360/77.08 |

*Primary Examiner*—William L. Sikes
*Assistant Examiner*—Tai V. Duong
*Attorney, Agent, or Firm*—Cushman, Darby & Cushman

[57] ABSTRACT

According to this invention, in a magnetic disk device for recording/reproducing data using a magnetic head, a position of which is controlled by a sector servo method, a tracking speed of an AGC amplifier is set to be a first speed (about 10 μs) in an AGC address area and an AGC burst area, and the tracking speed of the AGC amplifier is set to be a tracking speed (about 20 ms) lower than the first tracking speed in an intersector gap, a gap, a block address area, and a data area.

4 Claims, 6 Drawing Sheets

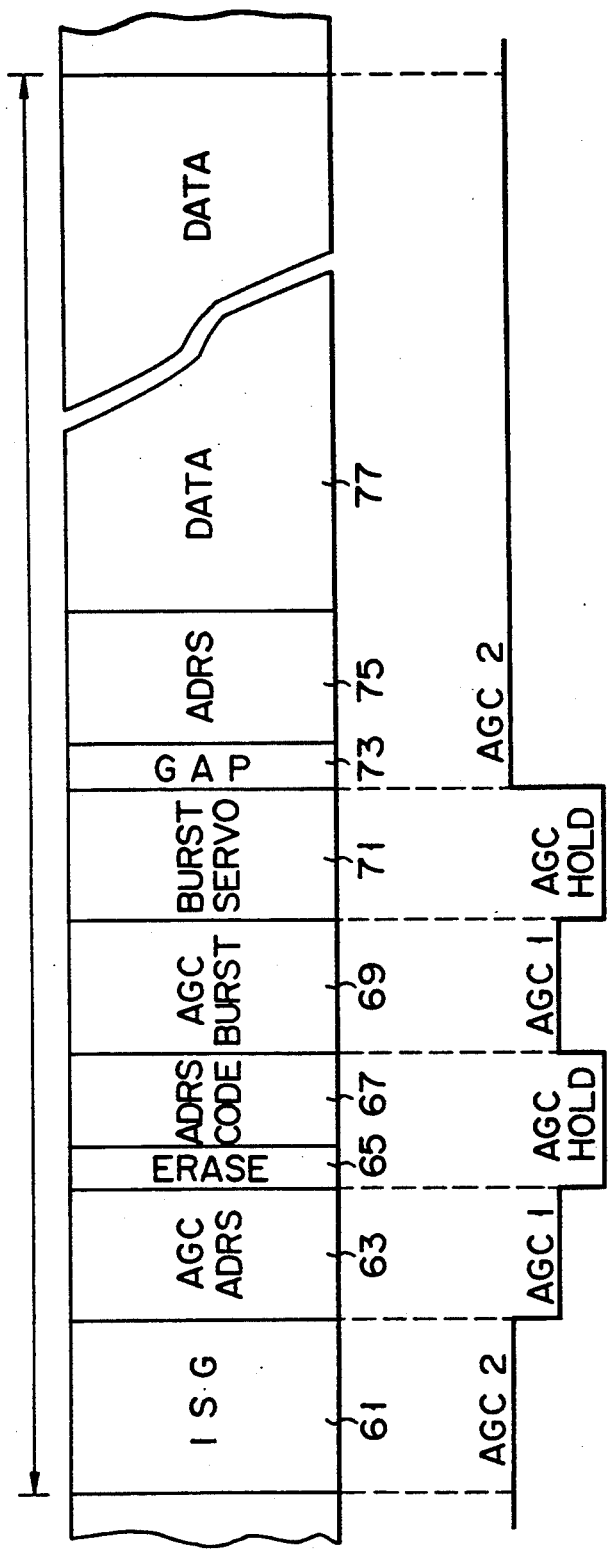
F I G. 4

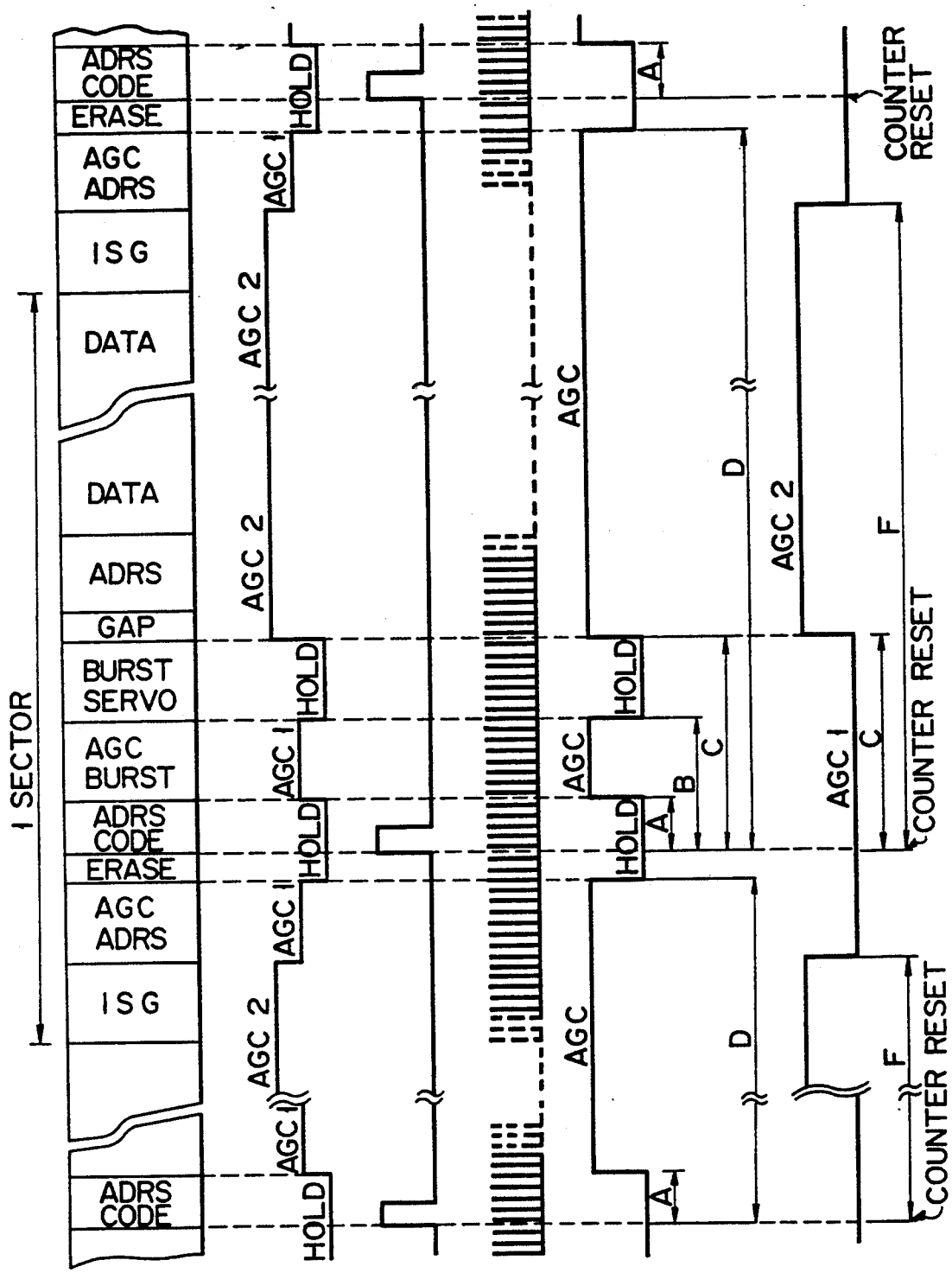

READ CIRCUIT IN MAGNETIC DISK DRIVE

BACKGROUND OF THE INVENTION

1. Field of the Invention

The present invention relates to a read circuit in a magnetic disk drive using a sector servo method.

2. Description of the Related Art

In a magnetic disk drive such as a floppy disk device or a hard disk device, when data recorded respectively on a plurality of cylinders provided in a concentric manner in a recording medium is read by a magnetic head, voltage peak values of read signals are different depending on cylinder positions. For this reason, according to a conventional method, read signals are amplified by an AGC (Automatic Gain Control) amplifier such that the voltage peak values of read signals read from different cylinders are equal to each other. A read circuit for controlling the gain of the AGC amplifier is arranged as shown in FIG. 1.

As shown in FIG. 1, data recorded on a recording medium 1 is read by a magnetic head 3, amplified by a head amplifier 5, and then input to an AGC amplifier 7. The noise component of a signal amplified by the AGC amplifier 7 is removed by a low-pass filter 9. Thereafter, the signal is input to a peak detection/read pulse generator 11, a sample/hold circuit 15, and an AGC voltage generator 13. The sample/hold circuit 15 detects head position setting data. The peak detection/read pulse generator 11 detects the peak value of the read signal (since data is written such that the peak position is set to be a magnetic reverse position) and generates a read pulse corresponding to the peak position. The read pulse is supplied to, e.g., a host processor through an interface control circuit 21. A main controller 23 outputs a command for determining whether the AGC voltage generator 13 is AGC-controlled (held) depending on a specific sector area which is read by the magnetic head. When the main controller 23 outputs an AGC signal, the AGC voltage generator 13 outputs an AGC voltage to the AGC amplifier 7. The value of the AGC voltage is changed in accordance with the voltage difference between a voltage peak value output from the low-pass filter 9 and a predetermined value, such that the voltage peak value output from the AGC amplifier 13 is adjusted to be the predetermined value. A speed for causing the output signal of the AGC amplifier 13 to reach the predetermined voltage peak value is generally called an AGC tracking speed. The tracking speed is divided into an attack time and a decay time. The attack time represents a time required for amplifying a small amplitude into a large target amplitude, and the decay time represents a time required for amplifying a large amplitude into a small target amplitude.

The AGC tracking speed is generally set to be a proper value (generally between ten and twenty ms) from an external circuit. In a servo surface servo method (also referred to as a dedicated servo method), in order to adjust the tracking position of a magnetic head, only the peak position of a waveform is detected. In a sector servo method, as shown in FIG. 2, the tracking position of a magnetic head is adjusted such that the amplitude value of a burst A signal is equal to the amplitude value of a burst B signal. For this reason, a read circuit of a magnetic disk drive in the sector servo method must strictly respond to an amplitude. Therefore, it is important how the same gain of the AGC amplifier 8 is obtained at the inner and outer peripheral portions of the magnetic disk. According to a conventional method of holding an AGC mode, only one time constant can set until the AGC mode is held. A recording data format in the sector servo method can be roughly divided into a servo area and a data area. The servo area is an area in which a head position setting signal is recorded, and the data area is an area in which data sent from a host processor is recorded. The servo and data areas are alternately arranged. In general, in order to record the maximum number of data in the data area, the data area is designated to be larger than the servo area as possible. For this reason, in the servo area, an AGC tracking speed must be increased to accurately read data written in a very small range.

Data having various frequencies are written in the data area. When low-frequency data is written in the data area after high-frequency data is written therein, the AGC mode is rapidly held to decrease the gain of the high-frequency data. At this time, the AGC mode is held on the low-frequency data, and the data is broken. For this reason, in the data area, the AGC tracking speed is preferably set to be low.

The magnetic characteristic curve of the recording medium has modulation. That is, the recording medium has some portions having small magnetic forces. Since the speed of a magnetic disk is generally three thousands and several hundreds rpm, a time for one rotation is between ten and twenty msec. At this time, when the tracking speed of the AGC amplifier is set to be, e.g., several hundreds $\mu$s, no AGC mode may be held on a portion having a small magnetic force.

In the sector servo method, data used as digital data and a head position setting data used as analog data are serially recorded in one sector. Since it is checked that the data section is set to be "1" or "0" at the peak positions of signals, the peak positions must be uniformed by the AGC mode. On the other hand, since the head position setting data, e.g., areas of the bursts A and B shown in FIG. 2, is processed with a ½ amplitude, the AGC mode is not preferably held on the position setting data. For this reason, an AGC/HOLD signal serving as a switching signal for performing a switching operation of an automatic gain control operation and a gain holding operation is input from the main controller 23 to the AGC voltage generator 13, thereby reading the recording data serving as digital data and the position setting data serving as analog data serially recorded.

Although the digital data and the analog data can be read by switching the operation modes of the AGC voltage generator 13, when the AGC amplifier 7 is switched into a gain holding mode, the gain of the AGC mode immediately before the AGC amplifier 7 is switched into the gain holding mode and is continuously held. For this reason, when there is a switch in the AGC gain immediately before the AGC amplifier 7, a predetermined target gain cannot be tracked because the AGC gain is held. Therefore, a peak value serving as the analog data may be erroneously detected.

SUMMARY OF THE INVENTION

It is an object of the present invention to provide a read circuit in a magnetic disk drive capable of improving a tracking speed for a predetermined gain, stably reading data, and accurately checking a peak value of analog data.

According to the present invention, a read circuit in a magnetic disk drive for recording/reproducing data using a magnetic head, a position of which is controlled by a sector servo method, comprises: an automatic gain control amplifier for amplifying a read signal of the magnetic head; tracking speed setting means for setting a tracking speed of automatic gain control of the automatic gain control amplifier into different speeds; and switch control means for controlling the tracking speed setting means in accordance with a content of the read signal of the magnetic head so as to change the tracking speed.

According to the present invention, a main control circuit controls the tracking speed setting means in accordance with the content of data read from a recording medium by a recording head, i.e., a format specification of each sector, so as to change the tracking speed of the AGC amplifier. Therefore, the tracking speed of the AGC amplifier is set to be lower while reading from the data area of a sector than while reading from the format area so as to slowly hold an AGC mode, thereby preventing data omissions.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 4 shows a format for one sector;

FIGS. 6A through 6F are timing charts of various signals shown in FIG. 4, in which FIG. 6A shows a data format of one sector in the sector servo method, FIG. 6B is a timing chart showing a signal output from a control signal generating circuit in accordance with each field of one sector, FIG. 6C is a timing chart showing a sector pulse signal, FIG. 6D shows a reference clock, FIG. 6E is a timing chart showing an AGC-/HOLD signal output from a control signal generating circuit, and FIG. 6F is a timing chart showing an AGC-1/AGC2 signal output from the control signal generating circuit.

DETAILED DESCRIPTION OF THE PREFERRED EMBODIMENTS

Figure 1:
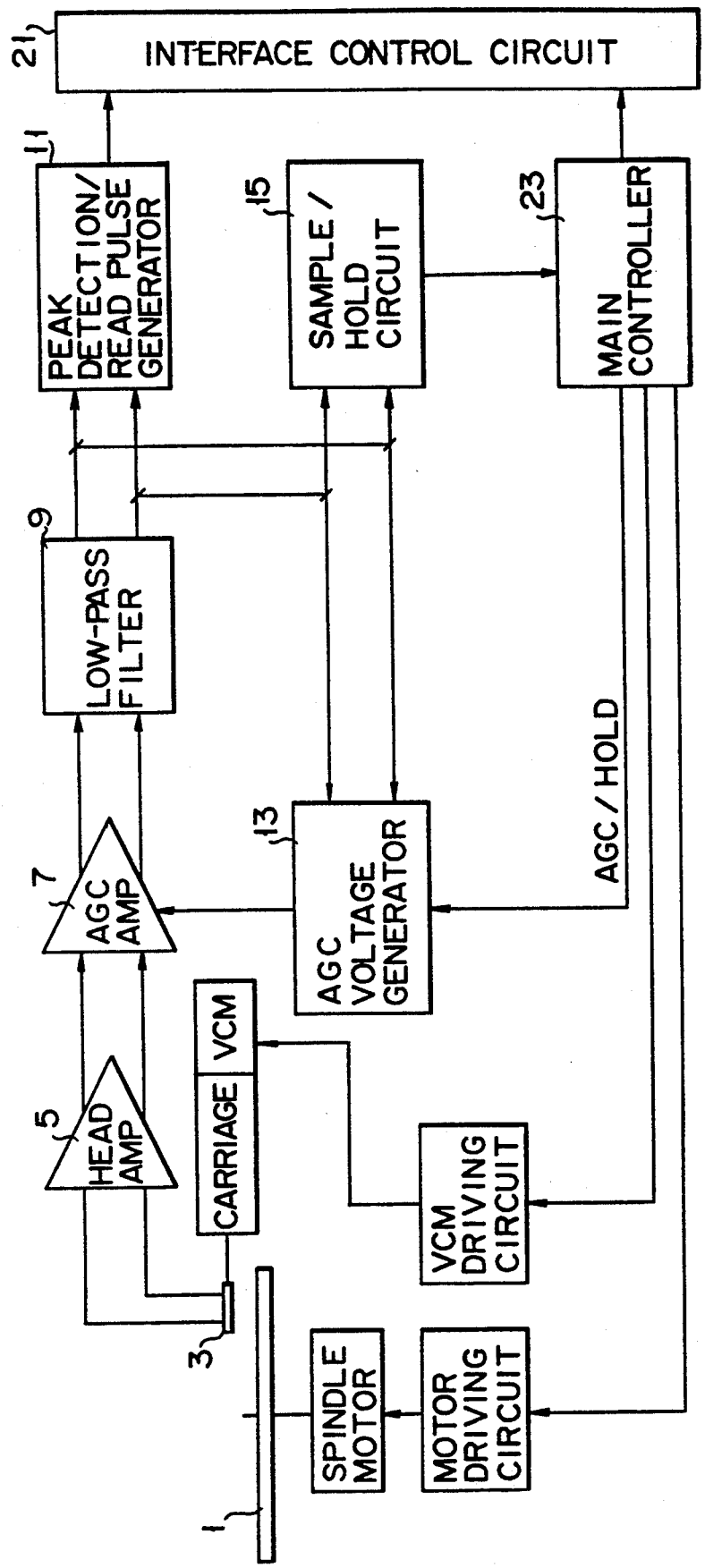
FIG. 1 is a block diagram showing an arrangement of a conventional read circuit in a magnetic disk drive.
Figure 2:
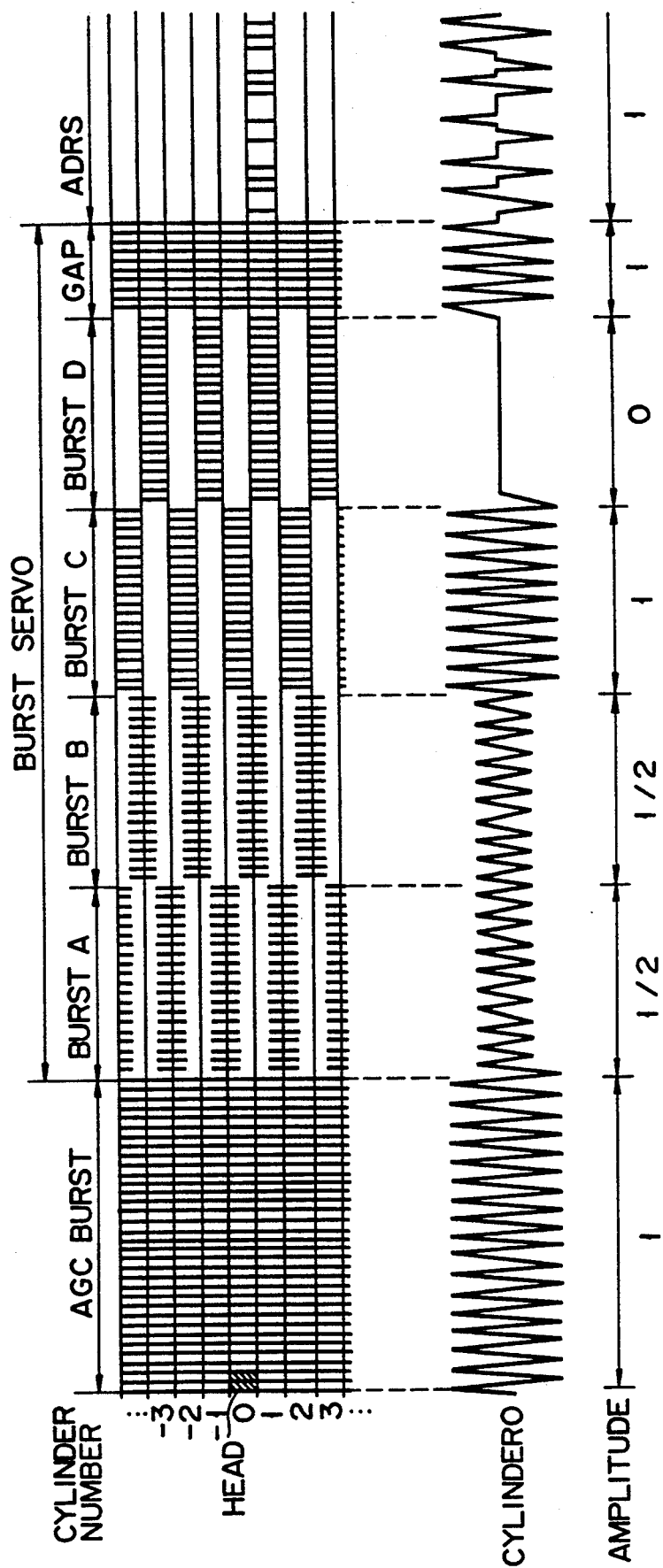
FIG. 2 is a chart for explaining tracking control of a magnetic head in a sector servo method.
Figure 3:
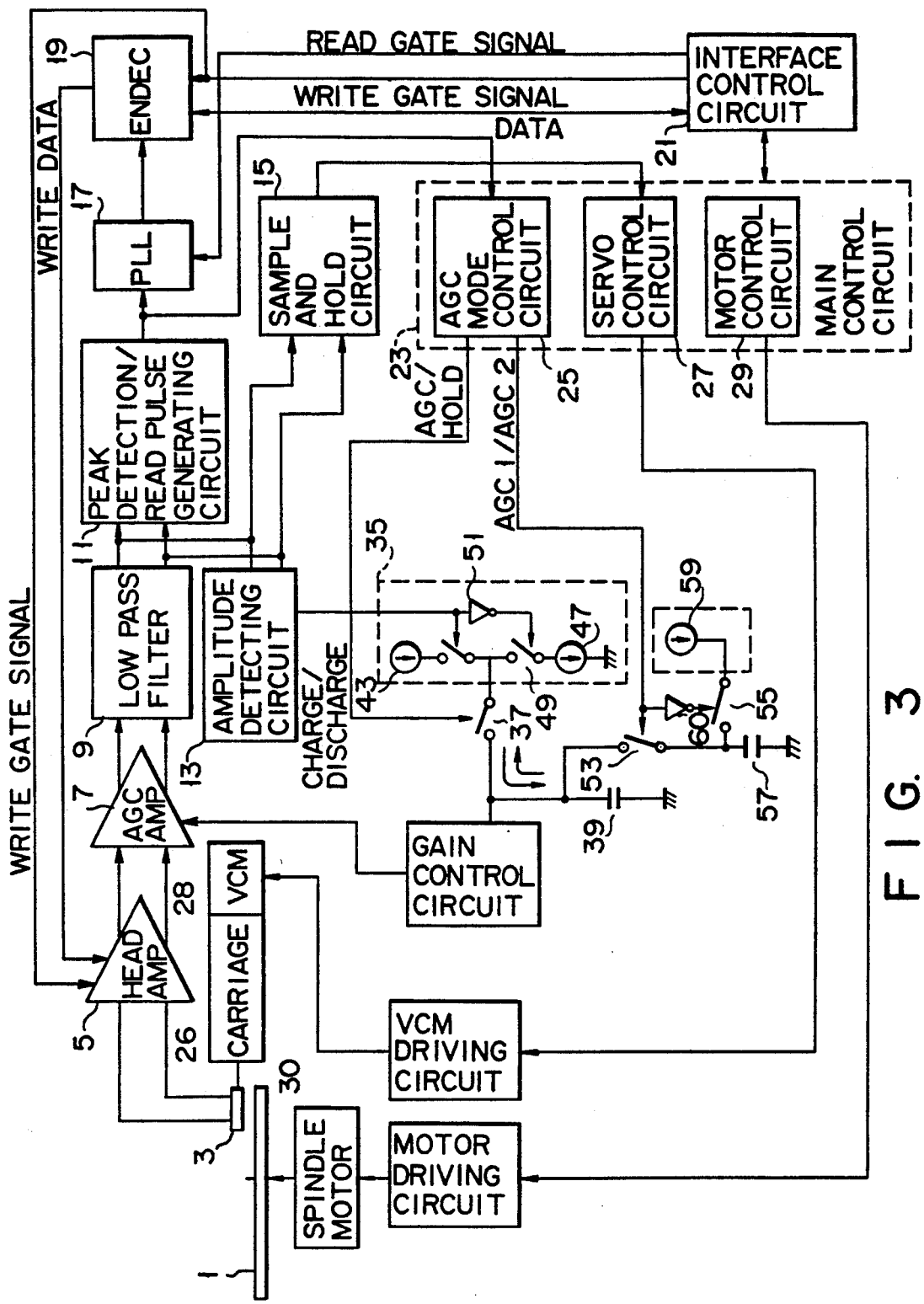
FIG. 3 is a block diagram showing a read circuit in a magnetic disk drive according to an embodiment of the present invention.

FIG. 3 is a block diagram showing a read circuit in a magnetic disk drive according to an embodiment of the present invention. The same reference numerals as in FIG. 1 denote the same parts in FIG. 3, and a description thereof will be omitted.

As shown in FIG. 3, a recording medium 1 is rotated by a spindle motor 30 controlled by a motor driving circuit 31, and data is read by the magnetic head 3. The magnetic head 3 supported by a carriage 26 is linearly moved by a voice coil motor 28 controlled by a voice coil motor driving circuit 33. The data recorded on the recording medium 1 is read by the magnetic head 3, amplified by a head amplifier 5, and then input to an AGC amplifier 7. The data recorded on the recording medium 1 is recorded by a sector servo method, and the format of the data is shown in FIG. 4.

FIG. 4 shows a format specification for one sector. In FIG. 4, an intersector gap (ISG) 61 is an area for absorbing positional shift of a sector head caused by rotational variation of a disk driving motor. An AGC address (AGC ADRS) area 63 is an area provided to define holding gains used in an erase (ERASE) area 65 and an absolute address (ADRS CODE) area 67 which follow to the AGC address area 63. The erase area 65 is an area for indicating a start position of the absolute address area 67. Cylinder data required for a seeking operation of the magnetic head is recorded in the absolute address area 67. An AGC burst (AGC BURST) area 69 is an area provided to define a holding gain used in a burst servo (BURST SERVO) area 71 which follows the AGC burst area 69. Position setting data for correcting the position shift of the head performed after the seeking operation is performed is recorded in the burst servo area 71. A gap (GAP) 73 is an area for absorbing positional shift of the first data in a sector. The block address (ADRS) area 75 is an area in which cylinder and sector data corresponding to format data are read/written. In the data (DATA) area 39, data sent from a host computer is written, and data to be sent to the host computer is read out.

After a noise component is removed by a low-pass filter 9 from a signal amplified by an AGC amplifier 7 shown in FIG. 3, the signal is supplied to a peak detection/read pulse generating circuit 11, an amplitude detecting circuit 13, and a sample and hold circuit 15. The sample and hold circuit 15 detects data for setting head position. A peak detection/read pulse generating circuit 16 detects the peak value of a read signal and generates a read pulse corresponding to the peak position. The amplitude detecting circuit 13 detects whether a signal passing through the low-pass filter 9 has a predetermined amplitude. An read pulse output from the peak detection/read pulse generating circuit 11 is supplied to a PLL (Phase Locked Loop) 17. The PLL 17 synchronizes the phase of a read gate signal from an interface control circuit 21 with the phase of the read pulse in response to the read gate signal. The read signal phase-locked with the read gate signal is decoded by an ENCDEC (ENCoder/DECoder) 19 and supplied to the interface control circuit 21. When the ENCDEC 19 writes data from a host processor, the ENCDEC 19 codes the data in response to a write gate signal supplied from the interface control circuit 21. The interface control circuit 21 is connected to the main control circuit 23. The main control circuit 23 includes an AGC mode control circuit 25, a servo control circuit 27, and a motor control circuit 29. The motor control circuit 29 controls a motor driving circuit 31, and the servo control circuit 27 controls a voice coil motor driving circuit 33. The AGC mode control circuit 25 controls opening/closing operations of a switch 37 to be described later. The switch 37 is closed in response to an AGC signal output from the AGC mode control circuit 25 and opened in response to a HOLD signal.

An amplitude detection signal from the amplitude detecting circuit 13 is supplied to a charge pump circuit 35. The charge pump circuit 35 is connected to a capacitor 39 through the switch 37, and it can charge/discharge the capacitor 39. A gain control circuit 41 is connected to the capacitor 39 and the AGC amplifier 7 to control the gain of the AGC amplifier 7 in accordance with the potential of the capacitor 39. That is, the voltage of the capacitor 39 is compared with a reference voltage value, and the output voltage value of the AGC amplifier 7 is linearly changed in accordance with the voltage difference. The gain of the AGC amplifier 7 is changed with this change in voltage. For example, when a signal from the low-pass filter 9 has an amplitude larger than a predetermined value, the gain control circuit 41 decreases the gain of the AGC amplifier 7. In contrast to this, when the signal from the low-pass filter 9 has an amplitude smaller than the predetermined value, the gain control circuit 41 increases the gain of the AGC amplifier 7.

The charge pump circuit 35 charges/discharges the capacitor 39 in response to an amplitude detection signal output from the amplitude detecting circuit 13. That is, when a signal from the low-pass filter 9 has an amplitude larger than a predetermined value, the capacitor 39 is discharged. When the signal has an amplitude smaller than the predetermined value, the capacitor 39 is charged. The charge pump circuit 35 comprises a charge current source 43, a switch 45, a discharge current source 47, a switch 49, and an inverter 50. When the capacitor 39 is charged, the switch 45 is turned on, and the switch 49 is turned off. When the capacitor 39 is discharged, the switch 45 is turned off, and the switch 49 is turned on. The switch 37 is turned on when an AGC/HOLD signal is set to be high level, and the switch 37 is turned off when the AGC/HOLD signal is set to be low level. The AGC mode control circuit 25 outputs an AGC signal in the AGC ADRS area 63, the AGC BURST area 69, the ADRS area 75, and the data area 77, and the AGC mode control circuit 25 outputs a HOLD signal in the ERASE area 65 and the SERVO area 71. In addition, the AGC mode control circuit 25 outputs an AGC1 signal when the tracking speed of the AGC amplifier 7 is set to be a first speed (e.g., about 10 μs), and the AGC mode control circuit 25 outputs an AGC2 when the tracking speed is set to be lower than the first speed (e.g., about 20 ms). When the AGC-1/AGC2 signals are set to be high level, a switch 53 is turned on, and a switch 55 is turned off by an inverter 60. When the AGC1/AGC2 signals are set to be low level, the switch 53 is turned off, and the switch 55 is turned on. At this time, a current source 59 charges a capacitor 57. That is, when the AGC1 signal is output, since a total capacitance is determined by only the capacitance of the capacitor 39, a small time constant can be obtained. Therefore, the tracking speed is increased. In contrast to this, when the AGC2 signal is output, since the total capacitance is a sum of the capacitances of the capacitors 39 and 57, a large time constant can be obtained. Therefore, the tracking speed is decreased. When the switch 53 is turned on, if the capacitor 57 has no charge, a current rushes into the capacitor 57, and the time constant is sharply changed. In order to prevent this, while the switch 53 is set to be an OFF state, the capacitor 57 is charged by the current source 59 to prevent the current from rushing to the capacitor 57.

Figure 5:
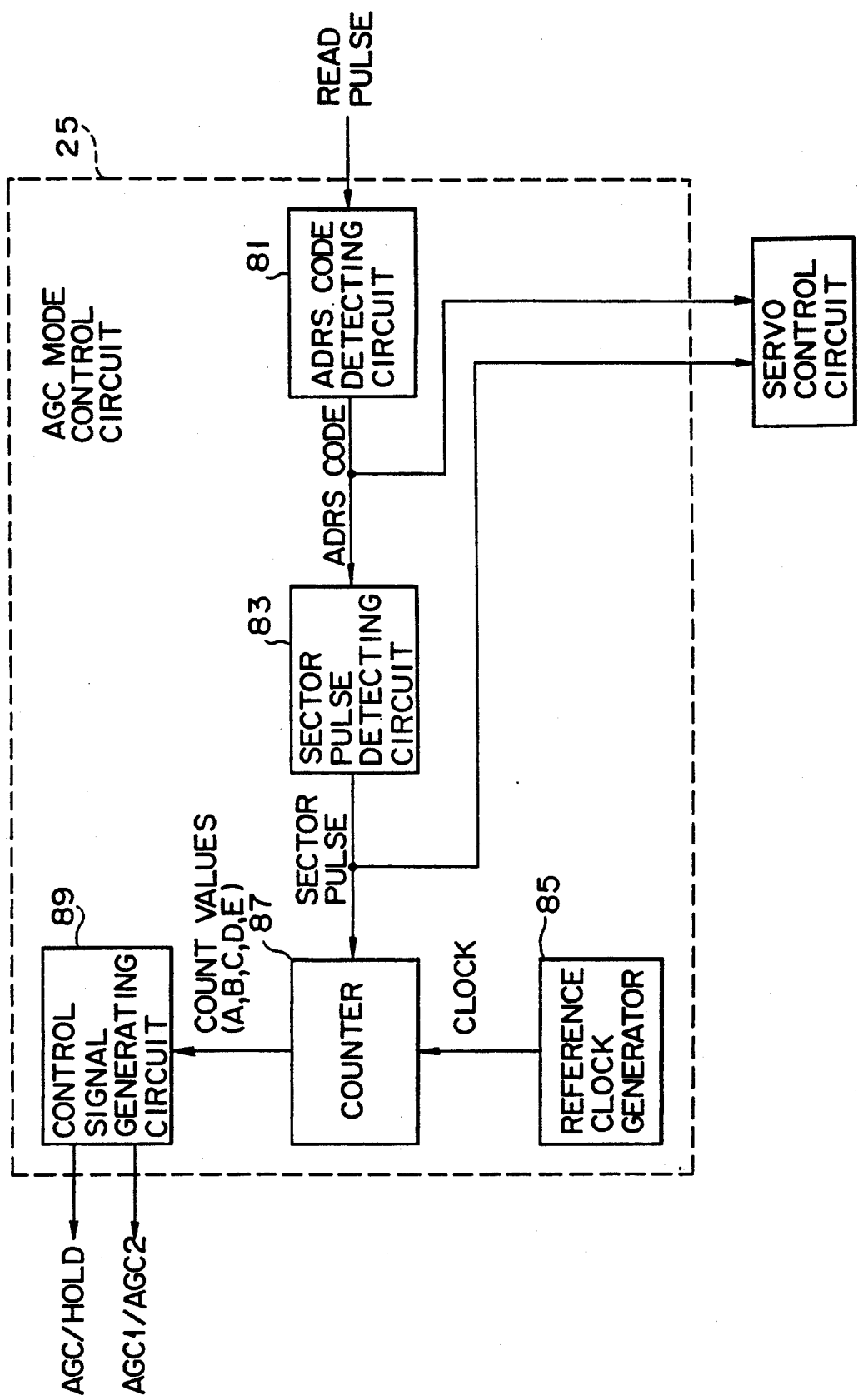
FIG. 5 is a detailed block diagram showing the AGC mode control circuit shown in FIG. 3.

FIG. 5 is a detailed circuit diagram showing the AGC mode control circuit 25 shown in FIG. 3.

A read pulse supplied from the peak detection/read pulse generating circuit 11 is supplied to an address code detecting circuit 81. The address code detecting circuit 81 detects an address code included in the read pulse and supplies the address code to a sector pulse detecting circuit 83. The address code is used as seek data. The sector pulse detecting circuit 83 generates a sector pulse indicating the start position of a sector from the address code. A counter 87 counts a reference clock signal from a reference clock generator 85. When the count value of the counter 87 reaches a predetermined value, the counter 87 supplies a count output signal to a control signal generating circuit 89. In this embodiment, the counter 87 outputs 6 count values "A" to "F". The control signal generating circuit 89 outputs AGC-/HOLD signals and AHC1/AGC2 signals in response to these count signals. The counter 87 is reset by a sector pulse from the sector pulse detecting circuit 83.

An operation of this embodiment of the present invention will be described below with reference to the timing charts shown in FIG. 6A to 6F.

The address code detecting circuit 81 shown in FIG. 5 reads a read pulse, detects an address code (FIG. 6A), and supplies the address code to the sector pulse detecting circuit 83. The sector pulse detecting circuit 83 supplies, e.g., the first bit of the address code to the counter 87 as a sector pulse (FIG. 6C). The counter 87 is reset in response to the sector pulse. In this state, the AGC mode control circuit 25 outputs a HOLD signal (i.e., low-level AGC/HOLD signals) and low-level AGC1/AGC2 signals (i.e., an AGC1 signal). In this state, the switches 37 and 53 are set to be an OFF state (open), and the switch 55 is set to be an ON state (closed). Therefore, the capacitor 57 is charged by the current source 59. In this state, an AGC mode is not held. The counter 87 restarts counting from an initial value in response to the sector pulse. As shown in FIG. 6E, when the count value becomes "A", the control signal generating circuit 89 outputs the AGC signal (high-level AGC/HOLD signals) and the AGC1 signal (low-level AGC1/AGC2 signals). As a result, the switches 37 and 55 are turned on. Therefore, the capacitor 57 is charged by the current source 59, and the capacitor 39 is charged/discharged by the charge pump circuit 35. The capacitor 39 is charged or discharged by a charge or discharge signal from the amplitude detecting circuit 13. At this time, since the switch 53 is set to be an OFF state, the gain control circuit 41 compares the potential of the capacitor 39 with a reference potential, and the potential of the AGC amplifier 7 is linearly controlled in accordance with the potential difference. As a result, as shown in FIG. 6B, the AGC is performed at the first tracking speed, e.g., about 10 μs, in the AGC BURST area.

As shown in FIG. 6E, when the counter value of the counter 87 becomes "B", the control signal generating circuit 89 outputs the HOLD signal. Therefore, since the switch 37 is turned off, the potential of the capacitor 39 is not changed. For this reason, as shown in FIG. 6B, in the BURST SERVO area, a read signal is amplified while the present gain of the AGC amplifier 7 is held. When the counter value of the counter 87 becomes "C", the control signal generating circuit 89 outputs the AGC signal as shown in FIG. 6E and outputs the AGC2 signal as shown in FIG. 6B. As a result, the switches 37 and 53 are turned on, and the switch 55 is turned off. For this reason, a total capacitance is a sum of the capacitances of the capacitors 39 and 57. As a result, a time constant is increased, and the capacitor 39 is slowly charged/discharged. In the gain control circuit 41, since the potential difference between the potential of the capacitor 39 and the reference potential is slowly changed, the trackin speed (e.g., about 20 ms) of the AGC amplifier 7 becomes lower than the first tracking speed (about 10 μs). As a result, the AGC mode is held in the GAP area 73, the ADRS area 75, the data area 77, and the ISG area 61 at a tracking speed lower than the first tracking speed.

When the count value of the counter 87 becomes "F" as shown in FIG. 6F, the control signal generating circuit 89 outputs the AGC1 signal. For this reason, the switch 53 is turned off, and the switch 55 is turned on. The capacitor 57 is charged by the current source 59, and the gain control circuit 41 linearly controls the voltage of the AGC amplifier 7 on the basis of the voltage difference between the potential of the capacitor 39 and the reference potential. The AGC mode is held on the AGC ADRS area 63 at the first tracking speed (about 10 μs). When the count value of the counter 87 becomes "D", the control signal generating circuit 89 outputs the HOLD and AGC1 signals. As a result, since the potential of the capacitor 39 is not changed, a read signal is amplified while the present gain of the AGC amplifier 7 is held in the ERASE area 65 and the ADRS CODE area 67 as shown in FIG. 6B. The above sequence is repeated in each sector.

Additional advantages and modifications will readily occur to those skilled in the art. Therefore, the invention in its broader aspects is not limited to the specific details, representative devices, and illustrated examples shown and described herein. Accordingly, various modifications may be without departing from the spirit or scope of the general inventive concept as defined by the appended claims and their equivalents.

What is claimed is:

1. A data reading method in a magnetic disk drive for recording and reproducing data using a magnetic head, comprising the steps of:
    positioning said magnetic head using a sector servo method;
    generating a signal based on contents of a sector which corresponds to a position of said magnetic head as read by said magnetic head, said sector including at least one absolute address area containing cylinder data required for a seeking operation of said magnetic head, at least one AGC address area containing a holding gain used in said absolute address areas, a burst servo area containing position data for correcting positional shifts of said head after said seeking operation is recorded, an AGC burst area for determining a holding gain used in said burst servo area, and a data area in which data sent from a host computer is recorded;
    amplifying said signal generated from said magnetic head by an automatic gain control amplifier (AGC amplifier);
    setting a tracking speed of said AGC amplifier to a first tracking speed in said AGC address area and in said AGC burst area in accordance with a content of said signal;
    setting a tracking speed of said AGC amplifier to a second tracking speed in said data area in accordance with a content of said signal; and
    holding a gain of said AGC amplifier in said absolute address area and in said burst servo area in accordance with a content of said signal.

2. A method according to claim 1, wherein said second tracking speed is set lower than said first tracking speed.

3. A data reading apparatus in a magnetic disk drive for recording and reproducing data, comprising:
    a magnetic head, positioned by a sector servo method, for generating a signal corresponding to data read from a sector, said sector including at least one absolute address area containing cylinder data required for a seeking operation of said magnetic head, at least one AGC address area containing a holding gain used in said absolute address areas, a burst servo area containing position data for correcting positional shifts of said head after said seeking operation is recorded, an AGC burst area for determining a holding gain used in said burst servo area, a data area in which data sent from a host computer is recorded;
    automatic gain control amplifier coupled to said magnetic head (AGC amplifier) for amplifying said signal generated by said magnetic head; and
    means coupled to said AGC amplifier, for setting a tracking speed of said AGC amplifier to a first tracking speed in said AGC address area and said AGC burst area, and to a second tracking speed in said data area, and for holding a gain of said AGC amplifier at a constant value in said absolute address area and said burst servo area, in accordance with a content of said signal.

4. A method according to claim 3, wherein said second tracking speed is lower than said first tracking speed.

* * * * *